Sept. 28, 1971  JUN SHIMOMURA  3,608,450

SINGLE LENS REFLEX CAMERA WITH INTERCHANGEABLE LENS

Filed Feb. 6, 1969

INVENTOR.
JUN SHIMOMURA
BY
Harry I. Shapiro
ATTORNEY

United States Patent Office 3,608,450
Patented Sept. 28, 1971

3,608,450
SINGLE LENS REFLEX CAMERA WITH
INTERCHANGEABLE LENS
Jun Shimomura, Tokyo, Japan, assignor to Nippon
Kogaku K.K., Tokyo, Japan
Filed Feb. 6, 1969, Ser. No. 797,109
Claims priority, application Japan, Feb. 17, 1968,
43/11,621
Int. Cl. G03b 7/04, 9/02, 19/12
U.S. Cl. 95—10C
5 Claims

ABSTRACT OF THE DISCLOSURE

Apparatus for mounting interchangeable lenses on a single lens reflex camera with a built in exposure meter which measures the light that has passed through the photo taking lens. Two signal members connected to the lens are rotatable with the diaphragm ring of the lens. One of the signal members communicates directly with the F stop readout mechanism of the camera. The other signal member is displaced a predetermined distance from the first signal member to engage the exposure meter of the camera and thereby actuate mechanisms within the camera to compensate for the optical characteristics of each interchangeable lens. The F stop indicating mechanism in the camera and the mechanism to compensate the exposure meter work independently of each other.

---

This invention relates to apparatus for mounting interchangeable lenses in single lens reflex cameras, which cameras incorporate built-in exposure meters.

In a so-called T.T.L. system single lens reflex camera, the light that is passed through the photo taking lens is measured by an exposure meter within the camera body to determine the proper exposure. When interchangeable lenses are used with such cameras, this exposure meter must be adjusted or compensated to the different optical characteristics of each lens, such as the F stop value, open F value, the exit pupil distance, aperture eclipse, aperture ratio, vignetting, etc.

This compensation between the lens and the exposure meter is usually accomplished by a signaling apparatus which integrates the various optical characteristics of the lens and transmits them to the exposure meter.

Because the signal from the lens to the exposure meter in the camera body combines several optical characteristics of the lens, it is difficult to extract the F stop value of the lens from the combined signal so that this value can be separately displayed in the camera. One method of obtaining direct information as to the F stop value of the lens is to separately transmit the F stop information through the diaphragm ring of the lens, while the remaining information for compensating the exposure meter is transmitted from a fixed portion of the interchangeable lens, such as the mounting bayonet of the lens. However, when the compensating signal is divided in this manner, an additional mechanism must be installed within the camera to combine the F stop signal with the other compensating signal, to obtain a true compensating value.

An object of this invention is to provide simplified means for indicating the F stop values of various interchangeable lenses on the camera body, without requiring additional mechanism within the camera body to separate or combine the F stop value and other information.

According to this invention, even in an interchangeable lens for T.T.L. single lens reflex camera, the stop value of the lens can be read out at the camera body without providing a differential mechanism within the camera. Moreover, since the signaling part of the lens can be combined with the diaphragm ring, control of preciseness of engineering and assembly can be made easier.

This invention will be described more clearly referring to the illustrative embodiments shown in the attached drawings, in which.

Figure 1:
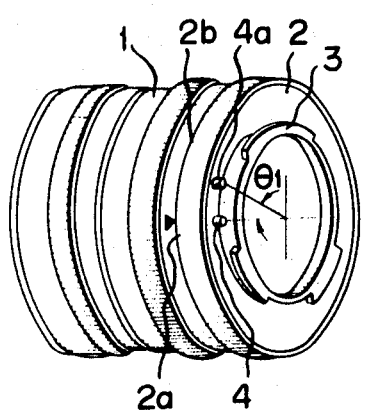
FIG. 1 is an external view showing an embodiment of an interchangeable lens according to this invention.
Figure 2:
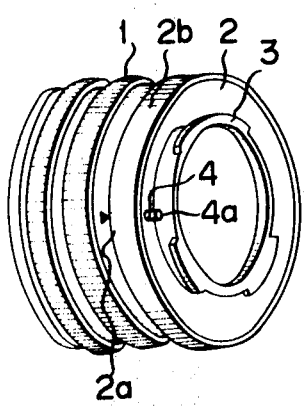
FIG. 2 is an external view similar to FIG. 1 of another embodiment of an interchangeable lens in accordance with this invention.
Figure 3:
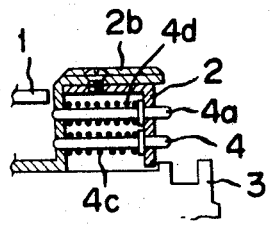
FIG. 3 is an enlarged cross section of a portion of said embodiments shown in FIGS. 1 and 2.

As is well known, an interchangeable lens body 1 is provided with a bayonet 3 and a diaphragm ring 2 at its rear end as shown in FIG. 1. The diaphragm ring 2 is provided with stop scale 2b and two pins 4, 4a that form signaling parts. These pins 4 and 4a in the embodiments shown in FIGS. 1 and 2 are pressed by a compression spring 4c and 4d toward the rear of the lens in the direction parallel to the optical axis as seen in FIG. 3 representing enlarged cross section containing the pins 4 and 4a. The positional relationship between these two pins 4 and 4a is as follows: the pin 4 constituting the first signaling part is positioned at a definite portion against stop scale graduate 2b for any of the various kinds of lenses as shown in FIGS. 1 and 2. In other words, its position is made to coincide with a graduate for a specific stop value (for example the graduate F/8 in the cases of FIGS. 1 and 2) found on any interchangeable lenses.

On the other hand, the other pin 4a will be located in accordance with the optical characteristics of the lens. For example, FIG. 2 shows the standard lens of T.T.L. open light measuring type lens which is used for reference therefore pin 4a is positioned at the same place as the said pin 4. In other interchangeable lenses such as the lens shown in FIG. 1 (for example, a telephoto lens having a full aperture different from that of the said standard lens), the pin 4a is installed at a point spaced from the pin 4 by an amount of exposure compensation which is determined by the open relative aperture, exit pupil distance, aperture eclipse of the lens and by the correlation that exists between these values and the light receiving portion of the exposure meter on the camera body.

In the camera body, two rings 12 and 13 are provided rotatably around the lens bayonet 14. The ring 12 has notch 12a, and the ring 13 a notch 13a. Moreover, the ring 12 is combined with a tubular section 11 having a gear section 11a, and the ring 13 is combined with a tubular section 15 having a gear section 15a. The gear section 15a is engaged with another gear 16 which has a belt 17 wound on one portion. The belt 17 is wound around the drum 20 which is placed under the bottom of and combined with the exposure meter after passing by a movable pulley 18 and stationary pulley 19 in order to rotate the exposure meter 21. The meter 21 has a spring 22 between it and the body to apply tension to the belt 17. The indicator 23 of the meter 21 is made visible within the finder by means of fixed point indexing section 24 provided on one edge of the focal plane 25 of the camera finder.

The movable pulley 18 is installed at one end of belt 8. The other end of the belt 8 is wound around the drum 7 which is coaxial with the shutter speed dial 5. The drum 7 has a well known construction with which it rotates by way of click board 6 corresponding to the angle of rotation caused when either the film speed setting or the shutter speed setting has been changed.

The gear section 11a of the ring 12 is engaged with the gear 10. The shaft 9 which is combined with the gear 10 has a screw 29, and one end of the shaft 9 is supported by the wall section 30 of the camera body. The said screw section 29 is fitted with a nut type movable pointer 27. The nut 27 is prevented by the said wall section 30 from rotating around its shaft 9. Opposite to the nut type movable pointer 27 is diaphragm scale 26 is installed on one end of the focusing plate 25 of the camera. A pentaprism 31 is located above the focusing plate 25, and an ocular lens 32 and light receiving body 33 are arranged behind the pentaprism 31. The light receiving body 33 forms a well known exposure meter circuit together with the meter 21, power supply 36, switch 35, and resistor 34.

Now the operation of this invention will be described. To mount the lenses shown in FIGS. 1 and 2 on the camera body shown in FIG. 4, the lens is first pressed against the camera body. Then the pin 4 planted in the diaphragm ring 2 hits the ring 12 of the camera body and retracts against the spring 4c. Simultaneously the pin 4a hits the ring 13 of the camera, retracts against spring 4d. Under these conditions, the lens rotated counterclockwise facing the camera body until it stops. it stops. Thus the lens mounting is completed. The pins 4 and 4a are so arranged that when the diaphragm ring 2 is rotated counterclockwise after the completion of mounting the lens, the said pin 4 will extend into the notch 12a of the ring 12 and the pin 4a will extend into the notch 13a of the ring 13 without fail somewhere before the diaphragm ring 2 is rotated to its smallest stop (F/22 in the cases of FIGS. 1 and 2) wherever the first positions of the notches 12a and 13a of the rings 12 and 13 may have been.

Once this connection of pins 4 and 4a is completed, then the amount of rotation of the ring 12 is transmitted by way of gear 10 as the rotation of the shaft 9, and the nut type pointer 27 fitted on the shaft moves frontward and backward on the stop scale to indicate the aperture, independently of the exposure calculating mechanism. On the other hand, the rotation of the gear 16 and belt drum 17 accompanying the rotation of the ring 13 is introduced to the well known exposure calculating mechanism quite independently of the aperture indication.

As was mentioned previously, since the pin 4 on the lens side is positioned at the specific graduate of the stop scale provided on any lens, for example F/8 in FIGS. 1 and 2, F/8 is also indicated as F/8 on the camera side whichever the lens is used. Moreover, the relative position of pin 4a to pin 4 on each lens insures that the signal required for open measurement with that lens is accurately transmitted to the exposure calculating mechanism within the camera body when the diaphragm ring 2 is rotated. For example, the pin 4a is at the matching position with the said pin 4 in the case of the standard lens shown in FIG. 2, and is dislocated from the position of pin 4 of of the lens shown in FIG. 1 by an amount θ, which is the amount to be compensated caused by the difference in the full aperture and the kind of lens as shown in FIG. 1.

Figure 4:
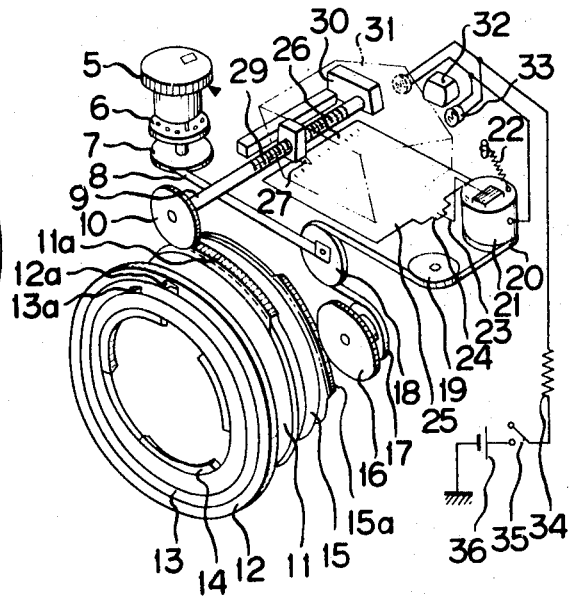
FIG. 4 is a schematic drawing of the construction of a camera to which an embodiment of a lens according to this invention is to be mounted.
Figure 5:
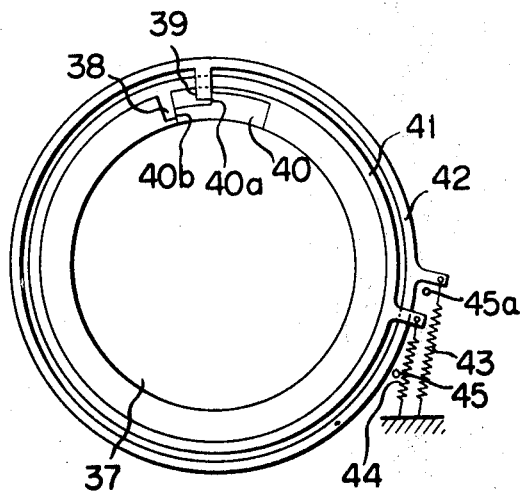
FIG. 5 is a front view showing another embodiment according to this invention.

This invention is also applicable to the case wherein the construction of the connecting section of the lens signaling part and the camera is not as shown in FIGS. 1, 2, and 4, but instead is of the well-known type in which the connecting parts 41 and 42 on the camera side are always pulled in one direction toward stops 45 and 45a the camera body by the springs 44 and 43. In this case it is sufficient to make a boss 40 on the diaphragm ring of the lens 37 as shown in FIG. 5. Boss 40 has a signaling surface 40a which connects to the boss 39 F stop of the display mechanism 42 and has a signaling surface 40b which connects to the boss 38 of the exposure calculating mechanism interlocking ring 41.

What is claimed is:

1. A single lens reflex camera with a built in exposure meter for measuring the intensity of light passing through the aperture of an interchangeable lens, and with a stop indicating means, the lens having a rotatable diaphragm ring for pre-adjusting the stop value of the lens, comprising a first signal member rotatable with the diaphragm ring and connected to said stop indicating means, said signal member being located at a position common to each of a plurality of interchangeable lenses, a second signal member independent of said first signal member rotatable with the diaphragm ring and connected to the exposure meter, the second signal member spaced from the first signal member by a predetermined amount to compensate for the optical characteristics of the lens and the relationship of these characteristics with the exposure meter, the rotation of both signal members permitting said stop indicating means to operate independently of said exposure meter.

2. A single lens reflex camera according to claim 1, wherein said signal members are angularly spaced on said diaphragm ring to rotate around the optical axis of said lens.

3. A single lens reflex camera according to claim 2 further comprising coupler means on the camera having first and second coupling rings adapted to coaxially rotate around the optical axis of said interchangeable lens, said first ring connected to said stop indicating means in said camera and adapted to couple with said first signal member, and said second ring connected to said exposure meter in said camera and adapted to couple with said second signal member.

4. A single lens reflex camera according to claim 3 wherein each of said first and second signal members is resiliently urged to project from said diaphragm ring, said first coupling ring includes groove means adapted to engage said first signal member, and said second coupling ring includes groove means adapted to engage said second signal member.

5. A single lens reflex camera according to claim 3 wherein each of said signal members is fixed on said diaphragm ring, and further comprising means urging rotation of each of said coupling rings to a fixed position, projecting means on the first coupling ring to engage said first signal member, and projecting means on the second coupling ring to engage said second signal member.

References Cited

UNITED STATES PATENTS

| | | | |
|---|---|---|---|
| 3,461,783 | 8/1969 | Fujii | 95—64X |
| 3,465,661 | 9/1969 | Hahn | 95—10 |
| 3,485,153 | 12/1969 | Ono et al. | 95—10 |
| 3,485,154 | 12/1969 | Yamada | 95—10 |

JOSEPH F. PETERS, JR., Primary Examiner

U.S. Cl. X.R.

95—42, 64B